(12) United States Patent
Fish

(10) Patent No.: US 12,181,054 B2
(45) Date of Patent: Dec. 31, 2024

(54) LINEAR ACTUATED 3 WAY SPOOL VALVE WITH CONSTANT TOTAL FLOW

(71) Applicant: Applied Materials, Inc., Santa Clara, CA (US)

(72) Inventor: Roger B. Fish, Bedford, MA (US)

(73) Assignee: Applied Materials, Inc., Santa Clara, CA (US)

( * ) Notice: Subject to any disclaimer, the term of this patent is extended or adjusted under 35 U.S.C. 154(b) by 552 days.

(21) Appl. No.: 17/383,501

(22) Filed: Jul. 23, 2021

(65) Prior Publication Data

US 2023/0028610 A1 Jan. 26, 2023

(51) Int. Cl.
*F16K 11/07* (2006.01)
*F16K 11/065* (2006.01)
*F16K 27/00* (2006.01)
*F28F 27/02* (2006.01)

(52) U.S. Cl.
CPC ........ *F16K 11/0716* (2013.01); *F16K 11/065* (2013.01); *F16K 11/07* (2013.01); *F16K 27/003* (2013.01); *F28F 27/02* (2013.01)

(58) Field of Classification Search
None
See application file for complete search history.

(56) References Cited

U.S. PATENT DOCUMENTS

| | | | | |
|---|---|---|---|---|
| 3,146,795 A | * | 9/1964 | Retallick | F16K 11/0856 137/625.23 |
| 3,993,099 A | * | 11/1976 | Nightingale | F16K 11/065 251/324 |
| 5,070,595 A | * | 12/1991 | Perkins | E21B 34/066 166/66.7 |
| 7,430,860 B2 | * | 10/2008 | Whitaker | F16H 61/40 60/464 |
| 2009/0008586 A1 | * | 1/2009 | Abe | H01F 7/13 251/129.2 |

* cited by examiner

*Primary Examiner* — Angelisa L. Hicks
(74) *Attorney, Agent, or Firm* — NIELDS, LEMACK & FRAME, LLC

(57) ABSTRACT

A three-way valve is disclosed. The valve achieved constant flow rate as the valve transitions from 100% flow through the first path to 100% flow through the second path. The valve is linearly actuated, which allows a plurality of valves to be efficiently disposed in a manifold. The valve comprises a spool having two passageways therethrough which converge at the input. The spool is disposed in a housing. By linear movement of the spool within the housing, the amount of the incoming flow that passes through each of the two passageways can be controlled. In certain embodiments, the spool is in communication with an actuator to control its position within the housing. The three-way valve may be used as part of a manifold.

14 Claims, 10 Drawing Sheets

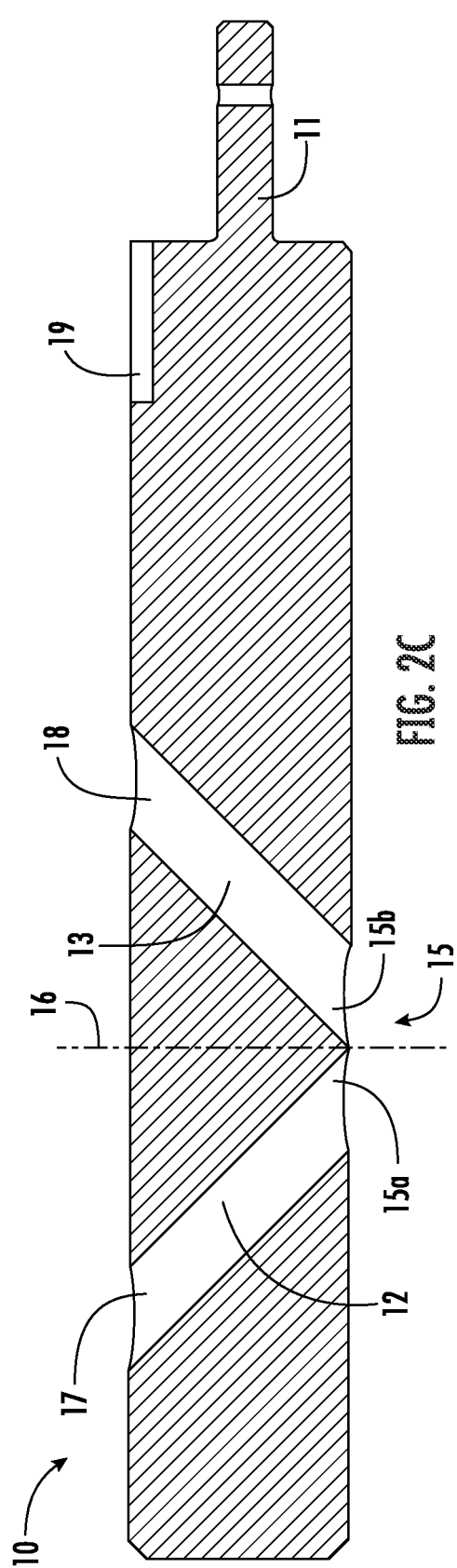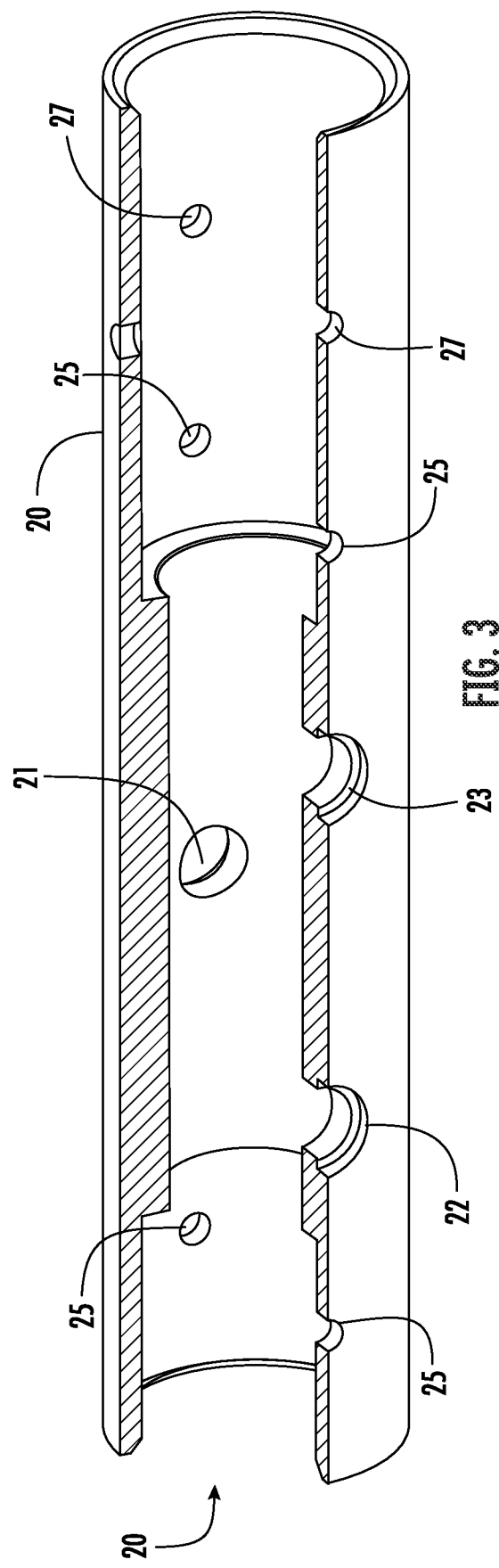

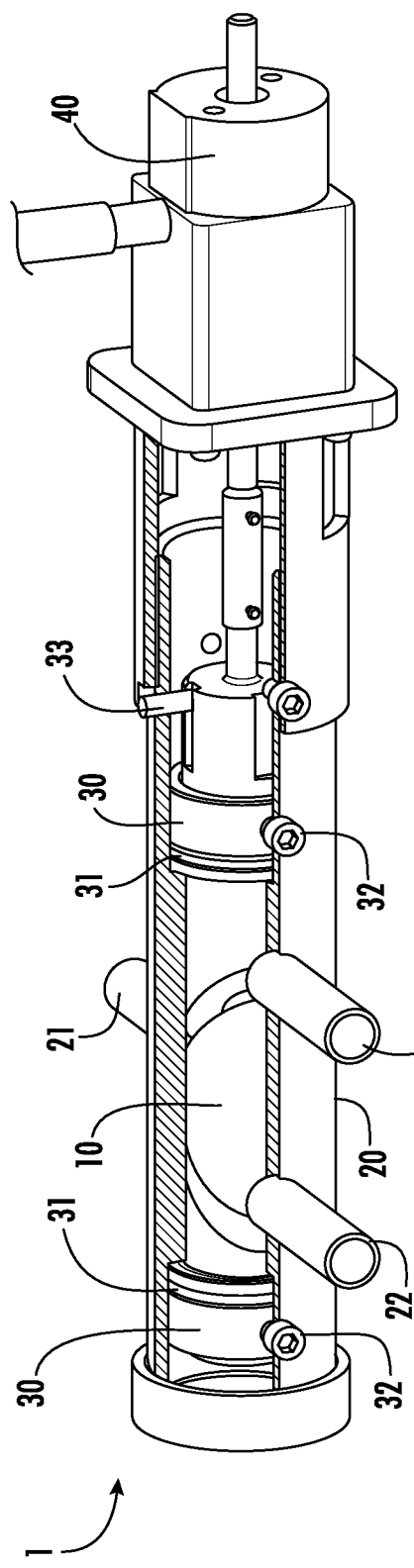
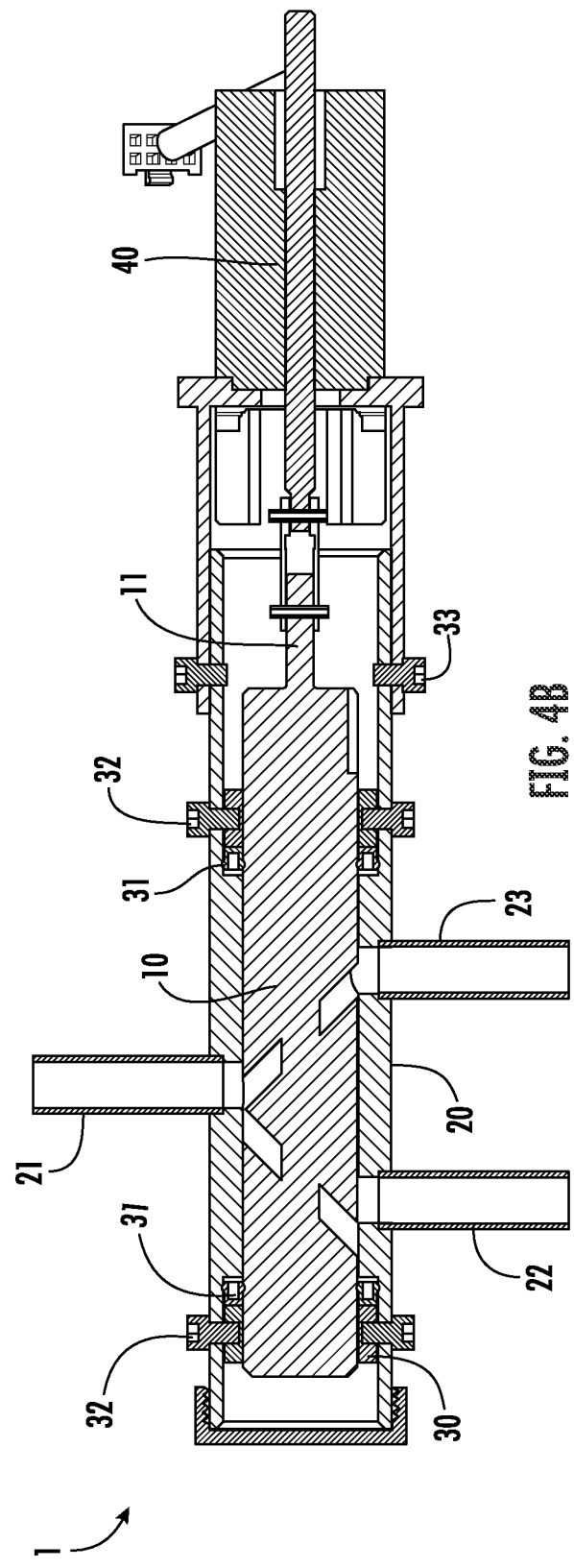
FIG. 4A
FIG. 4B

LINEAR ACTUATED 3 WAY SPOOL VALVE WITH CONSTANT TOTAL FLOW

FIELD

This disclosure describes a linear actuated valve, and more specifically, a valve with a constant total flow.

BACKGROUND

Often, it is desirable to divert the flow of a fluid, either gas or liquid, through one of two different paths. Additionally, at times, it is desirable to have the fluid flow through each path, such that a predetermined percentage of the incoming flow travels through each path.

Diverting a flow through a first path, a second path or both paths may be done using a T-port ball valve. However, T-port ball valves do not typically allow the incoming flow to be divided between the two paths according to an arbitrary ratio. Rather, in the split position, the T-port ball valve diverts an equal amount of the incoming flow to each path.

Alternatively, a splitter may be used. Flow control valves may be in communication with each of the outputs so as to allow an arbitrary percentage of the total incoming flow to travel through each path.

Additionally, in some embodiments, the source of the fluid may be best operated with a constant output flow rate. However, neither of these approaches allows an arbitrary separation of the fluid from the source into the two flows, while achieving a constant total flow rate.

Therefore, it would be beneficial if there were an apparatus that could separate an incoming fluid flow into two paths, where the flow rate remains constant as the apparatus transitions from 100% flow through the first path to 100% flow through the second path.

SUMMARY

A three-way valve is disclosed. The valve achieved constant flow rate as the valve transitions from 100% flow through the first path to 100% flow through the second path. The valve is linearly actuated, which allows a plurality of valves to be efficiently disposed in a manifold. The valve comprises a spool having two passageways therethrough which converge at the input. The spool is disposed in a housing. By linear movement of the spool within the housing, the amount of the incoming flow that passes through each of the two passageways can be controlled. In certain embodiments, the spool is in communication with an actuator to control its position within the housing. The three-way valve may be used as part of a manifold.

According to a first embodiment, a linear actuated valve is disclosed. The linear actuated valve comprises a housing having a housing inlet, a first housing outlet and a second housing outlet, each in communication with a hollow interior of the housing; a spool disposed in the hollow interior and having a first passageway and a second passageway, where a first end of each passageway converges at an inlet opening, forming a first portion and a second portion of the inlet opening, a second end of the first passageway comprises a first outlet opening and the second end of a second passageway comprises a second outlet opening; and an actuator to translate the spool along a major axis of the spool. In certain embodiments, the first passageway and the second passageway pass through an interior of the spool. In certain embodiments, the first passageway and the second passageway pass through a majority of a cross section of the spool, and wherein a dowel extends through a center of the spool and is used to connect sections of the spool. In some embodiments, the housing inlet is smaller than the inlet opening such that, in a first position, the housing inlet overlaps the first portion and does not overlap the second portion such that fluid passes through the first passageway, and, in a second position, the housing inlet overlaps the second portion and does not overlap the first portion such that fluid passes through the second passageway. In some embodiments, in the first position, the first housing outlet overlaps the first outlet opening and the second housing outlet does not overlap the second outlet opening and in the second position, the second housing outlet overlaps the second outlet opening and the first housing outlet does not overlap the first outlet opening. In certain embodiments, as the spool moves from the first position to the second position, a total flow rate through the linear actuated valve is constant. In certain embodiments, a distance between a midpoint of the first housing outlet and a midpoint of the second housing outlet along the major axis is equal to a minimum distance between the first outlet opening and the second outlet opening along the major axis. In some embodiments, the linear actuated valve comprises two seals disposed between the housing and the spool, such that the housing inlet, the first housing outlet and the second housing outlet are disposed between the two seals. In certain embodiments, a groove is disposed in the spool and an alignment pin passes through the housing and enters the groove and is used to inhibit rotation of the spool about the major axis. In some embodiments, the housing comprises a modular housing and comprises an inlet passage, a bypass port and an outlet, wherein the inlet passage enters one side of the housing, passes through the housing and exits on an opposite side of the housing and is in communication with the housing inlet; wherein the bypass port enters one side of the housing, passes through the housing and exits on an opposite side of the housing and is in communication with the second housing outlet; and wherein the outlet is in communication with the first housing outlet.

According to another embodiment, a manifold is disclosed. The manifold comprises a plurality of linear actuated valves each having a modular housing, wherein the inlet passage of each of the plurality of linear actuated valves are in communication with one another, and wherein the bypass port of each of the plurality of linear actuated valves are in communication with one another.

According to another embodiment, a cooling system for use in a semiconductor processing system is disclosed. The cooling system comprises a chiller, having an output that supplies a chilled fluid at a constant flow rate and an input to receive a recirculated fluid; the manifold described above, wherein the inlet passage is in communication with the output of the chiller and the bypass port is in communication with the input to the chiller; and a platen, comprising a plurality of cooling channels, wherein a first end of each cooling channel is in communication with the outlet of one of the modular housings, and the second end of each cooling channel is in communication with the input to the chiller.

According to another embodiment, a valving system having a plurality of linear actuated valves is disclosed. The valving system comprises a manifold comprising a plurality of hollow interior portions, wherein a portion of the manifold surrounds each hollow interior portion, and is referred to as an internal valve housing, and wherein each internal valve housing comprises a housing inlet, a first housing outlet and a second housing outlet, each in communication with the hollow interior portion; and wherein each valve comprises: the internal valve housing; a spool disposed in the hollow interior portion and having a first passageway and a second passageway, where a first end of each passageway converge at an inlet opening, forming a first portion and a second portion of the inlet opening, a second end of the first passageway comprises a first outlet opening and the second end of a second passageway comprises a second outlet opening; and an actuator to translate the spool along a major axis of the spool; wherein the housing inlet of each valve is in communication with an inlet port, the first housing outlet of each valve comprises a dedicated output and the second housing outlet of each valve is in communication with a common outlet port.

According to another embodiment, a cooling system for use in a semiconductor processing system is disclosed. The cooling system comprises a chiller, having an output that supplies a chilled fluid at a constant flow rate and an input to receive a recirculated fluid; the valving system described above, wherein the inlet port is in communication with the output of the chiller and the common outlet port is in communication with the input to the chiller; and a platen, comprising a plurality of cooling channels, wherein a first end of each cooling channel is in communication with one of the dedicated outputs, and the second end of each cooling channel is in communication with the input to the chiller.

According to another embodiment, a linear actuated valve is disclosed. The linear actuated valve comprises a housing having a first housing inlet, a second housing inlet, a first housing outlet and a second housing outlet, each in communication with a hollow interior of the housing; a spool disposed in the hollow interior and having a first passageway and a second passageway, where a first end of the first passageway comprises a first inlet opening, a first end of the second passageway comprises a second inlet opening, a second end of the first passageway comprises a first outlet opening and the second end of a second passageway comprises a second outlet opening, and wherein the first inlet opening and the second inlet opening are separated by a separation distance; and an actuator to translate the spool along a major axis of the spool. In certain embodiments, a distance between a midpoint of the first housing inlet and a midpoint of the second housing inlet is equal to the separation distance. In some embodiments, the first housing inlet is in communication with a first branch of an inlet conduit, and the second housing inlet is in communication with a second branch of the inlet conduit. In some embodiments, a flow restrictor is disposed in the second branch. In certain embodiments, in a first position, the first housing inlet overlaps the first inlet opening and the second housing inlet does not overlap the second inlet opening such that fluid passes through the first passageway, and, in a second position, the second housing inlet overlaps the second inlet opening and the first housing inlet does not overlap the first inlet opening such that fluid passes through the second passageway, and wherein as the spool moves from the first position to the second position, a total flow rate through the linear actuated valve is constant. In some embodiments, in the first position, the first housing outlet overlaps the first outlet opening and the second housing outlet does not overlap the second outlet opening and in the second position, the second housing outlet overlap the second outlet opening and the first housing outlet does not overlap the first outlet opening.

BRIEF DESCRIPTION OF THE FIGURES

For a better understanding of the present disclosure, reference is made to the accompanying drawings, which are incorporated herein by reference and in which:

FIG. 2C shows a cross-sectional view of the spool of FIGS. 2A-2B;

FIG. 3 shows a perspective view of the housing used to hold the spool;

FIG. 4A shows a perspective view of the valve using the spool of FIG. 1A-1B according to one embodiment;

FIG. 4B shows a cross-sectional view of the valve using the spool of FIG. 1A-1B according to one embodiment;

DETAILED DESCRIPTION

The present disclosure describes a three-way (3-way) valve that may be utilized to maintain a constant flow as the valve transitions from 100% flow through the first path to 100% flow through the second path. The 3-way valve is linearly actuated, denoting that the spool is linearly translated along the major axis of the spool without rotation.

The valve comprises a spool, which is disposed within a housing. An actuator, such as a stepper motor, may be used to translate the spool. Additionally, seals may be used to reduce or eliminate the flow of fluid between the spool and the housing.

Figure 1A:
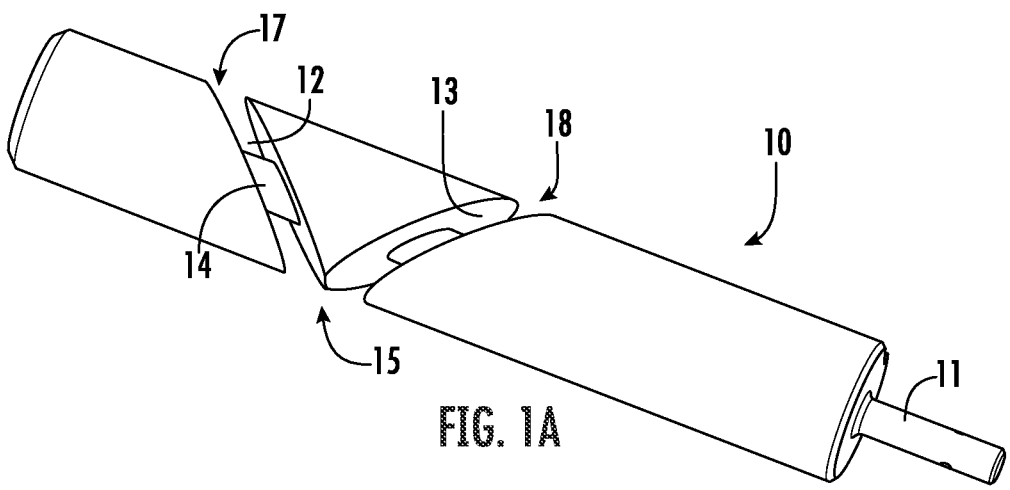
FIG. 1A shows a perspective view of a spool that may be used to construct the 3-way valve according to one embodiment.
Figure 1B:
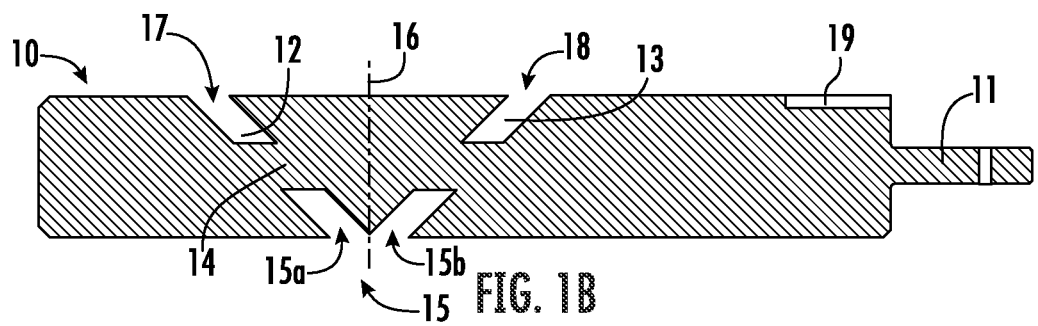
FIG. 1B shows a cross-sectional view of the spool of FIG. 1A.

FIG. 1A shows a perspective view of the spool according to one embodiment. FIG. 1B shows a cross-sectional view of the spool according to this embodiment.

In this embodiment, the spool 10 is a cylinder. The spool 10 may be constructed of any suitable material, including, but not limited to a metal, such as stainless steel, or a plastic, such as Teflon. The spool 10 may have any desired diameter, such as 1 inch or more. The length of the spool 10 may also vary as well. In certain embodiments, the spool 10 may be between 4 and 8 inches, although other dimensions may be used. A thin cylinder 11 may extend from one end of the spool 10 to allow connection to an actuator, as shown in FIG. 4A. The spool 10 comprises a first passageway 12 and a second passageway 13. In this embodiment, the first passageway 12 and second passageway 13 are disposed through a majority of the cross-section of the spool 10. Thus, to allow the spool 10 to remain an integral component, a dowel 14 extends through its center, connecting all sections of the spool 10. Thus, in this embodiment, the first passageway 12 and the second passageway 13 pass through an entirety of the cross section of the spool 10, with the exception of the dowel 14.

The first ends of the first passageway 12 and the second passageway 13 converge at an inlet opening 15. The inlet opening 15 has a first portion 15a and a second portion 15b, wherein the first end of the first passageway 12 comprises the first portion 15a, and the first end of the second passageway 13 comprises the second portion 15b. The first portion 15a and the second portion 15b may be equal in size. The midpoint of the inlet opening 15, passing perpendicularly through the spool 10, is denoted by dotted line 16. This midpoint also defines the boundary between the first portion 15a and the second portion 15b. In certain embodiments, inlet opening 15 may be oval in shape, formed by the slanted passageways converging together. As a result, the width of the inlet opening 15 (which is the direction perpendicular to dotted line 16) may be roughly twice the height of the inlet opening 15. Further, in certain embodiments, the inner wall that separates the two passageways as they converge extends so as to be flush with the outer surface of the spool 10. Further, the two passageways may meet at a line. In other words, as seen in FIGS. 1A-1B, the cross-section of the spool 10 shows that the two passageways meet at a point, which is coplanar with the outer surface of the spool 10. In this way, the inner wall completely separates the two passageways so that all flow may be diverted to one of the two passageways if desired.

In certain embodiments, the first passageway 12 and the second passageway 13 are symmetrical about dotted line 16. In this way, the length, width and shape of the first passageway 12 and the second passageway 13 are identical. This may help ensure that the distribution of fluid between the two passageways is accurate.

The second end of the first passageway 12 terminates in a first outlet opening 17. The second end of the second passageway 13 terminates in a second outlet opening 18.

In certain embodiments, a groove 19 may be disposed in one or both ends of the spool 10. The groove 19 may be used in conjunction with an alignment pin to hold the spool 10 in place, and may also be used to limit the range of motion of the spool 10, as described below. Further, the groove 19 may also prevent the spool 10 from rotating about its major axis in the housing 20.

Figure 2A:
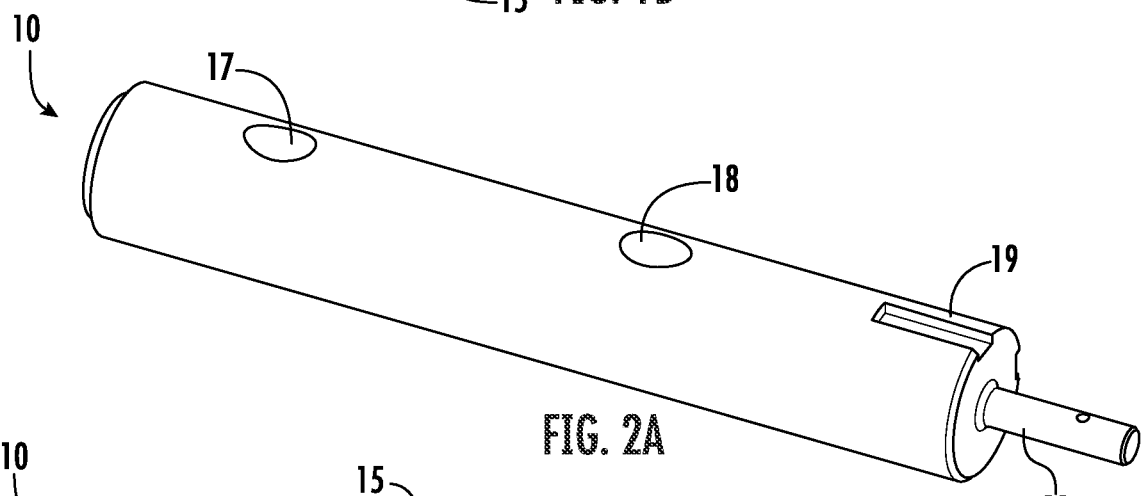
FIGS. 2A-2B show perspective views of a spool that may be used to construct the 3-way valve according to a second embodiment.
Figure 2B:
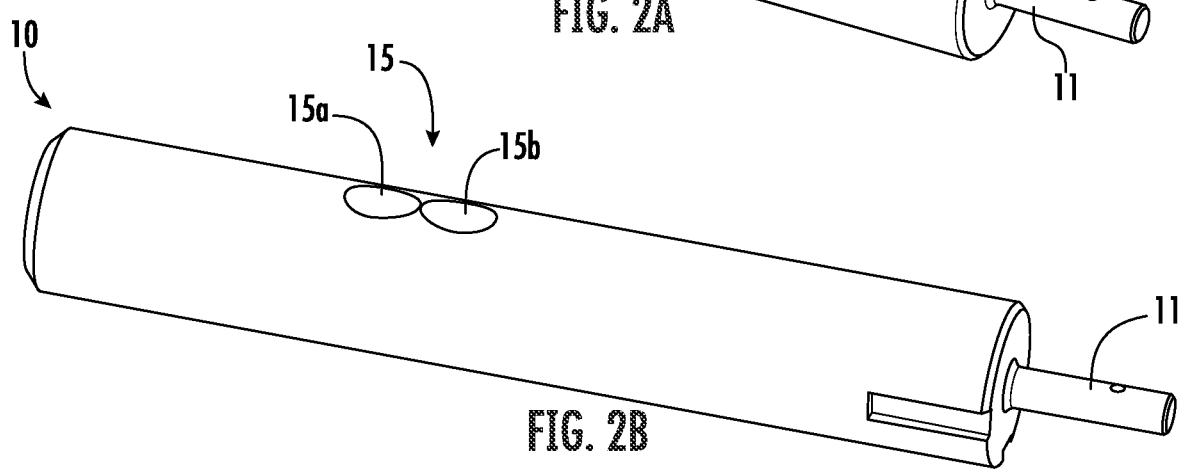

FIG. 2A shows a perspective view of the spool according to another embodiment. FIG. 2B shows a perspective view of the spool of FIG. 2A showing the opposite surface. FIG. 2C shows a cross-sectional view of the spool according to this embodiment.

In this embodiment, the first passageway 12 and the second passageway 13 pass through an interior of the spool 10, such that the spool 10 surrounds each passageway. In this embodiment, the central dowel is not used. As was described above and is shown in FIG. 2B, the first ends of the first passageway 12 and the second passageway 13 converge at an inlet opening 15. The inlet opening 15 has a first portion 15a and a second portion 15b, wherein the first end of the first passageway 12 comprises the first portion 15a, and the first end of the second passageway 13 comprises the second portion 15b. The first portion 15a and the second portion 15b may be equal in size. The midpoint of the inlet opening 15, passing perpendicularly through the spool 10, is denoted by dotted line 16. This midpoint also defines the boundary between the first portion 15a and the second portion 15b. The shape of the inlet opening 15 may be as described above. Further, as described above, in certain embodiments, the inner wall that separates the two passageways as they converge extends so as to be flush with the outer surface of the spool 10. Further, the two passageways may meet at a line. In other words, as seen in FIG. 2C, the cross-section of the spool 10 shows that the two passageways meet at a point, which is coplanar with the outer surface of the spool 10. In this way, the inner wall completely separates the two passageways so that all flow may be diverted to one of the two passageways if desired. In certain embodiments, the first passageway 12 and the second passageway 13 are symmetrical about dotted line 16. In this way, the length, width and shape of the first passageway 12 and the second passageway 13 are identical. This may help ensure that the distribution of fluid between the two passageways is accurate.

The second end of the first passageway 12 terminates in a first outlet opening 17. The second end of the second passageway 13 terminates in a second outlet opening 18.

In certain embodiments, a groove 19 may be disposed in one or both ends of the spool 10. The groove 19 may be used in conjunction with an alignment pin to hold the spool 10 in place, and may also be used to limit the range of motion of the spool 10, as described below. Further, the groove 19 may also prevent the spool 10 from rotating about its major axis in the housing 20.

Although the previous figures show the first passageway 12 and the second passageway 13 as being straight, it is understood that the passageways may have any suitable shape. Further, the cross section of the passageways may be constant throughout the spool 10, or may change if desired. Further, the cross section of the passageways may be selected to achieve a desired flow rate and/or pressure. For example, smaller cross sections may act as a flow restrictor.

In certain embodiments, the inlet opening 15 and the outlet openings may be disposed on opposite sides of the spool 10 such that each passageway is straight and the line passing through the center of the ends of each passageway passes through the center of the spool 10. In other words, when viewing the spool 10 from one end, the inlet opening and the outlet openings are offset by 180°. However, while the figures show the inlet opening 15 and the outlet openings being on opposite sides of the spool 10, other configurations are possible. For example, the inlet opening 15 and the outlet openings may be offset by less than 180°, such as 120° or 90°.

Additionally, while the spool 10 is described as being a cylinder, it is understood that other shapes may be used. For example, the spool 10 may be a rectangular prism, a hexagonal prism, or another suitable shape. Thus, the spool is defined as any structure, such as a cylinder or prism, that has an inlet opening, and two passageways each in communication with the inlet opening and a respective outlet opening, which may be disposed within a housing.

FIG. 3 shows a housing 20 that may be utilized with the spools 10 of FIGS. 1A-1B and 2A-2C. The housing 20 has an interior surface with a cross section that is the same shape as the cross section of the spool 10. In other words, if the spool 10 is a cylinder, the interior surface of the housing 20 is also a cylinder. In some embodiments, the shape of the cross section of the exterior surface of the housing 20 is the same as the cross section of the interior surface of the housing 20. In other words, if interior surface of the housing 20 is a cylinder, the exterior surface is also a cylinder. In this embodiment, the housing 20 is a hollow cylinder.

However, in other embodiments, the outer surface may be a different shape than the inner surface of the housing 20. For example, the outer surface of the housing 20 may be any shape that is advantageous for the construction of the valve assembly. For example, as shown in FIGS. 7A-7D, the inner surface of the housing may be cylindrical, while the outer surface is a rectangular prism.

The housing 20 comprises a housing inlet 21, which may be smaller than the inlet opening 15 on the spool 10. Specifically, the housing inlet 21 may have a size that is roughly equal to one half of the inlet opening 15. In other words, the width of the housing inlet 21 may be roughly equal to the distance from one edge of the inlet opening 15 to the dotted line 16. The height of the housing inlet 21 may be roughly the same as the height of the inlet opening 15. In other words, the housing inlet 21 may be roughly the same size as the first portion 15a or second portion 15b.

The housing 20 also comprises a first housing outlet 22 and a second housing outlet 23. The first housing outlet 22 may be roughly or exactly the same size as the first outlet opening 17, while the second housing outlet 23 may be roughly or exactly the same size as the second outlet opening 18. For example, the first housing outlet 22 and the second housing outlet 23 may be within 20% of the size of the first outlet opening 17 and second outlet opening 18, respectively. The difference in the sizes of these openings may be determined based on the ability to effectively seal the gap between the spool 10 and the housing 20.

The housing 20 may also include seal holes 25. As better seen in FIG. 4A, these seal holes 25 are used to secure the retaining rings 30 that hold the seals 31. The housing 20 may also include alignment holes 27, which may be used to maintain the spool 10 in alignment, as will be described in more detail below. Finally, the housing 20 may include mounting holes, which are used to attach a spool drive mechanism.

The first housing outlet 22, second housing outlet 23, and housing inlet 21 are shown in FIG. 3 as being holes. However, it is understood that the housing 20 may include attachment mechanisms that surround each of these holes. For example, a fitting, such as a barbed fitting may be included in the housing 20, surrounding these holes to readily allow connection to tubes or other conduits.

Before describing the operation of the valve, the other components that comprise the valve are described.

Figure 4C:
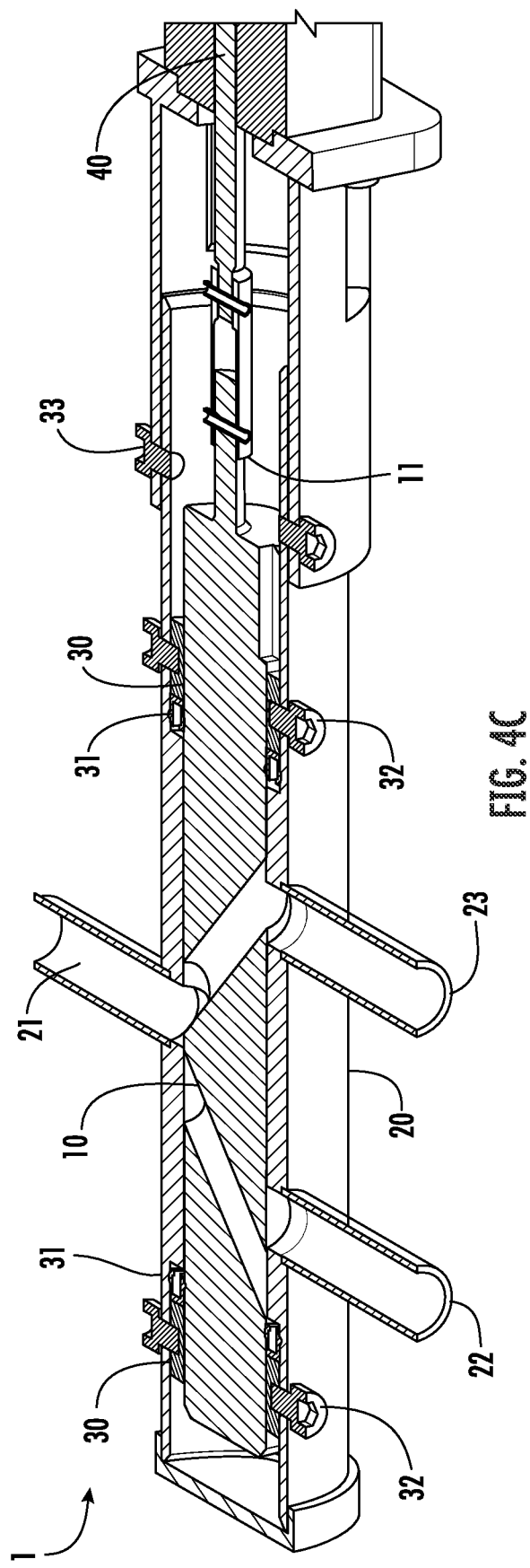
FIG. 4C shows a cross-sectional view of the valve using the spool of FIG. 2A-2C according to one embodiment.

In FIGS. 4A-4B, a valve 1 is shown which utilizes the spool shown in FIGS. 1A-1B. In FIG. 4C, a valve 1 is shown that utilizes the spool shown in FIGS. 2A-2C. In these embodiments, the housing inlet 21, the first housing outlet 22 and the second housing outlet 23 include conduits surrounding the openings that allow connection to the source and destinations. On either side of the spool 10, a retaining ring 30 is disposed. The retaining rings 30 are disposed such that the housing inlet 21, the first housing outlet 22 and the second housing outlet 23 are located between the two retaining rings 30. The retaining rings 30 are held in place by fasteners 32, which pass through the seal holes 25. The fasteners 32 may be screws, for example. The retaining rings 30 are used to hold seals 31 in place. The seals 31 may be lip seals or O-rings. The seals 31 are used to prevent the flow of fluid that may be disposed in the gap between the housing 20 and the spool 10 from exiting the valve 1.

While a seal 31 with a retaining ring 30 is disclosed, it is understood that other configurations may be used to present leakage of fluid from the valve 1. For example, in another embodiment, a groove may be created along an interior surface of the housing 20 and an O-ring or similar seal may be disposed in the groove.

Alignment pins 33 may be inserted into alignment holes 27. These alignment pins 33 may enter the grooves 19 in the spool 10, so as to maintain the spool 10 in alignment. In addition, if the grooves 19 have two ends, the grooves 19 may also limit the translational range of movement of the spool 10. Further, the alignment pins 33 also prevent the spool 10 from rotating about its major axis. In other embodiments, the alignment holes 27, the alignment pins 33 and the groove 19 may not be utilized.

An actuator 40 may be in communication with the spool 10. In certain embodiments, the actuator 40 is in communication with the thin cylinder 11 that extends from the spool 10. In other embodiments, the actuator 40 may be in communication directly with the spool 10. The actuator 40 may be a stepper motor or any suitable motor that may translate the spool 10 linearly along its major axis. The actuator 40 may be in communication with a controller that controls the movement of the actuator 40.

Figure 5A:
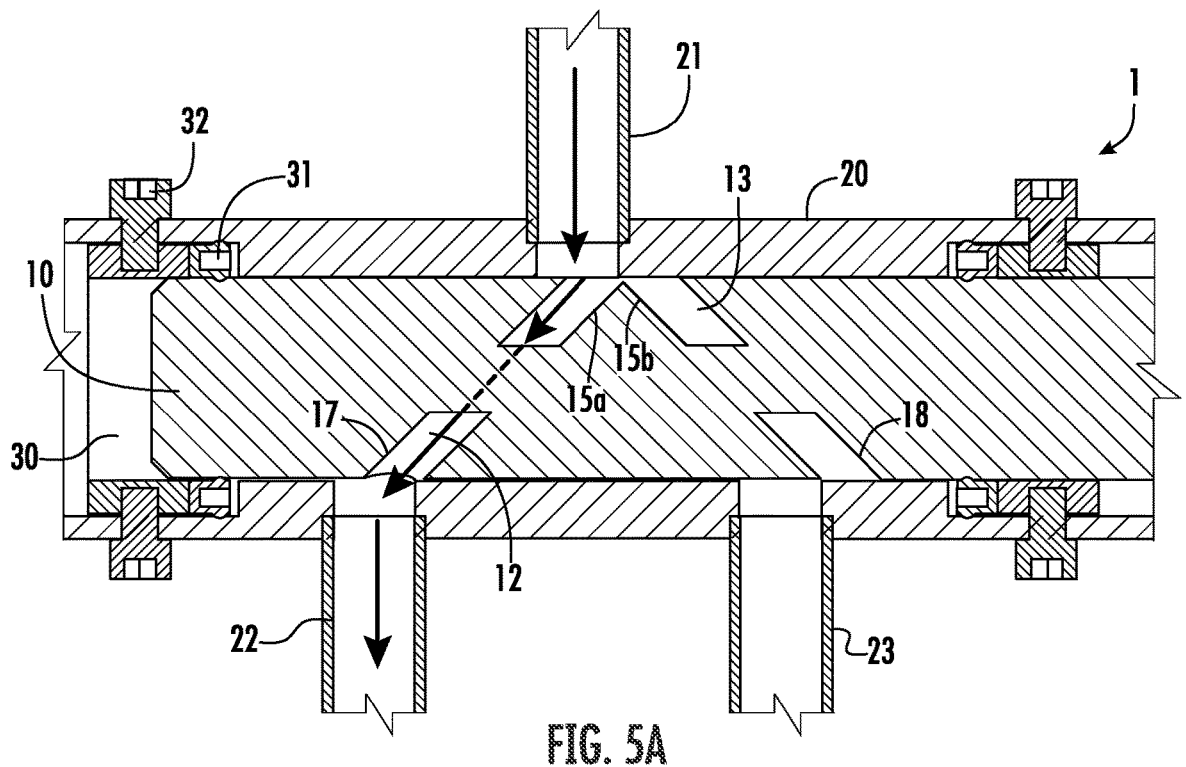
FIG. 5A shows the 3-way valve configured such that all flow is through the first passageway.
Figure 5B:
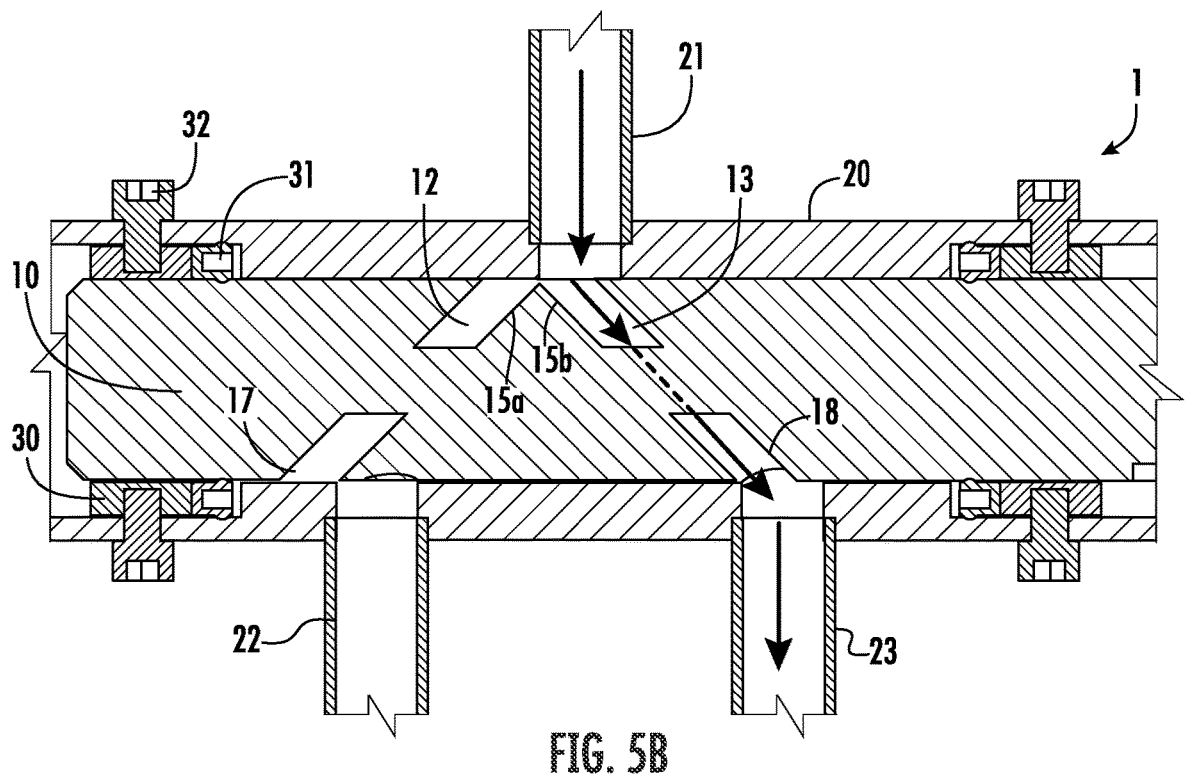
FIG. 5B shows the 3-way valve configured such that all flow is through the second passageway.
Figure 5C:
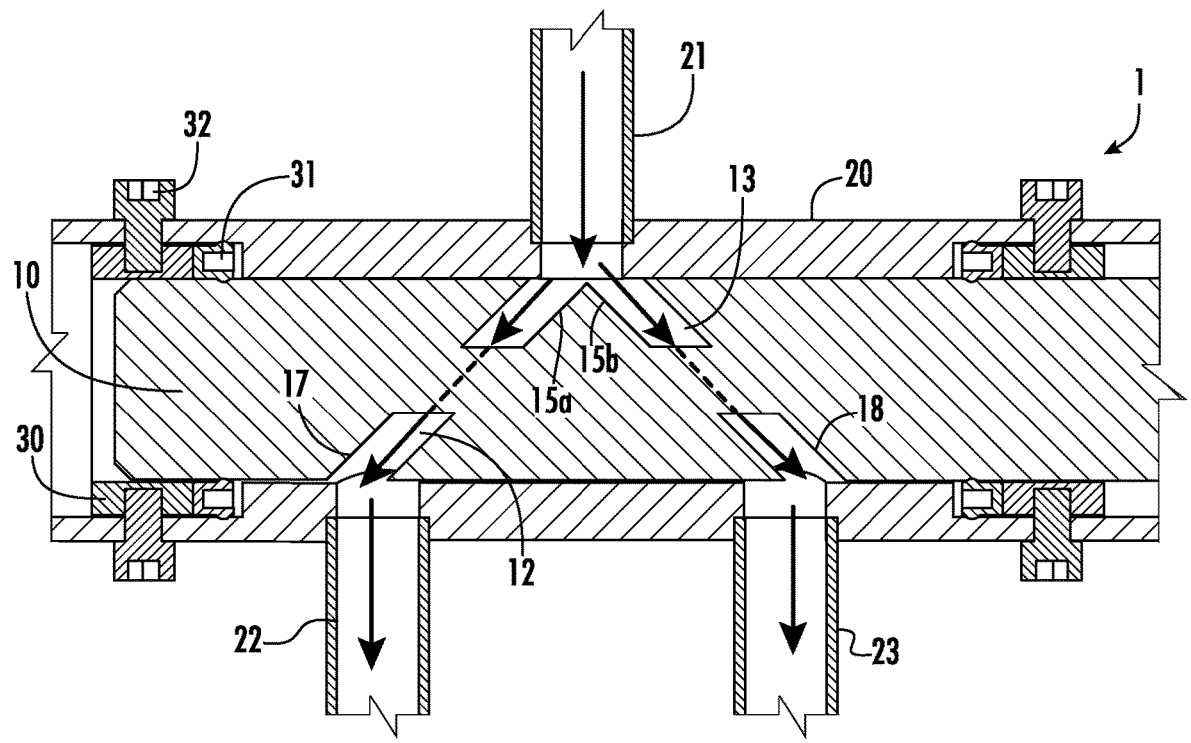
FIG. 5C shows the 3-way valve configured such that the flow is equally divided between the first passageway and the second passageway.

Having described the components of the valve 1, its operation will be described. FIGS. 5A-5C shows the spool 10 disposed in the housing 20 in three different positions. In these figures, the view is expanded to show the passageways and therefore, the actuator 40 is not visible.

In FIG. 5A, the spool 10 is extended to a first position, which is closest to the actuator 40. In this position, the housing inlet 21 is alignment with the first portion 15a. According, the fluid flows through the housing inlet 21 into the first passageway 12. Further, the inner wall of the spool 10 that separates the first passageway 12 and the second passageway 13 also prevents the flow of fluid through the second passageway 13. Furthermore, the second housing outlet 23 is not aligned with the second outlet opening 18. Conversely, the first housing outlet 22 is aligned with the first outlet opening 17. In fact, the first outlet opening 17 may overlap 100% of the first housing outlet 22, while the second outlet opening 18 may not overlap the second housing outlet 23 at all. Thus, in this position, 100% of the fluid flow, or nearly 100% of the fluid flow, is through the first passageway 12. The distance between the midpoint of the first housing outlet 22 and the midpoint of the second housing outlet 23 along the major axis may be the same as the minimum distance between the first outlet opening 17 and the second outlet opening 18 along the major axis.

In FIG. 5B, the spool 10 is extended a second position away the actuator 40. In this position, the housing inlet 21 is alignment with the second portion 15b. According, the fluid flows through the housing inlet 21 into the second passageway 13. Further, the inner wall of the spool 10 that separates the first passageway 12 and the second passageway 13 also prevents the flow of fluid through the first passageway 12. Furthermore, the second housing outlet 23 is aligned with the second outlet opening 18. Conversely, the first housing outlet 22 is not aligned with the first outlet opening 17. In fact, the second outlet opening 18 may overlap 100% of the second housing outlet 23, while the first outlet opening 17 may not overlap the first housing outlet 22 at all. Thus, in this position, 100% of the fluid flow, or nearly 100% of the fluid flow, is through the second passageway 13.

In FIG. 5C, the spool 10 is extended to a third position that is between the first position and the second position. In this position, the housing inlet 21 is in communication with both the first portion 15a and the second portion 15b. As stated above, the housing inlet 21 has roughly the same size as either portion. Thus, when the spool 10 is the third position, a portion of the housing inlet 21 is aligned with the first portion 15a and a portion of the housing inlet 21 is aligned with the second portion 15b. The percentage of the housing inlet 21 that is aligned with each portion may indicate the percentage of fluid flow through each passageway. For example, in FIG. 5C, approximately half of the housing inlet 21 is aligned with the first portion 15a and half of the housing inlet 21 is aligned with the second portion 15b. Additionally, note that the percentage of the first portion 15a that overlaps with the housing inlet 21 is roughly equal to the percentage of the first outlet opening 17 that overlaps the first housing outlet 22. Likewise, the percentage of the second portion 15b that overlaps with the housing inlet 21 is roughly equal to the percentage of the second outlet opening 18 that overlaps the second housing outlet 23. Thus, roughly 50% of the fluid flows through each passageway.

Thus, the present valve defines two mechanisms to regulate flow. First, as described above, the inlet opening 15 is moved relative to the housing inlet 21, such that the housing inlet 21 overlaps with inlet opening 15. The position of the housing inlet 21 relative to the inlet opening determines the percentage of flow that goes through each passageway. Second, the first and second outlet openings are moved relative to the first and the second housing outlets. The percentage of overlap between each outlet opening and its respective housing outlet may be indicative of the percentage of the total flow that passes through that housing outlet.

By actuating the actuator 40, the percentage of the housing inlet 21 that is aligned with each portion of the inlet openings may be precisely adjusted, allowing the fluid flow to be arbitrarily split between the two passageways. Furthermore, as the spool 10 is moved from the first position, shown in FIG. 5A to the second position, shown in FIG. 5B, it is always in communication with at least one of the passageways. Thus, the flow rate remains constant as the spool 10 is translated within the housing 20.

The valve 1 described herein may be incorporated into a manifold allowing multiple valves 1 to be arranged in parallel, thus creating a valving system. FIG. 6 shows one such manifold 100. FIG. 6B shows a cross-section of the manifold 100 through line A-A'. FIG. 6C shows a cross-section of the manifold 100 through line B-B'. The manifold 100 may be constructed from the same materials that are used for the housing 20 shown in FIG. 3.

The manifold 100 comprises a plurality of hollow interior portions, each of which is adapted to contain a spool 10. Each hollow interior portion 103 may be surrounded by a portion of the manifold that forms a housing around the hollow interior portion 103. This portion may be referred to as the internal valve housing. Each internal valve housing is similar to the housing 20 described with respect to FIG. 3. Thus, it may include the seal holes and the alignment holes described above. Each internal valve housing, respective spool and actuator comprises a valve 1. Thus, each internal valve housing comprises a housing inlet and two housing outlets, similar to those shown in FIG. 3.

In this embodiment, one of the housing outlets of each valve 1 is dedicated to a respective destination, while the other housing outlet is common for the three valves 1. In other words, the first housing outlet 37 of the internal valve housing is in communication with an output of the manifold 100. The second housing outlet 38 of the internal valve housing is in communication with a common passageway that connects to the second housing outlets of all other internal valve housings. For example, in one embodiment, the source of fluid may be a constant flow rate source. However, the flow rate of fluid that is to be directed to each destination may vary over time. Consequently, the remainder of the fluid is diverted to a bypass path. Thus, the second passageway 13 for each valve 1 may be a bypass path, while each first passageway 12 for each valve 1 is directed to a respective destination.

The source of the fluid is common for all valves 1 in the manifold 100. This fluid may enter through inlet port 101. The bypass path for all of the valves 1 may be common and may exit through common outlet port 102.

As noted above, the first passageway of each spool 10 may be in communication with a respective dedicated outlet, such as first manifold outlet 105, second manifold outlet 106 and third manifold outlet 107. Each valve 1 may have a respective actuator 40 and spool 10. In the manifold shown in FIGS. 6A-6C, there is no dedicated housing associated with each spool 10, as was shown in the earlier figures. Rather, the housings of each valve 1 are incorporated into the manifold 100 as described above.

As seen in FIG. 6B, the inlet port 101 is in communication with each hollow interior portion 103. As seen in FIG. 6C, the second housing outlet 38 from all of the internal valve housings are all connected to the common outlet port 102. The first housing outlets 37 are all separate.

Figure 6A:
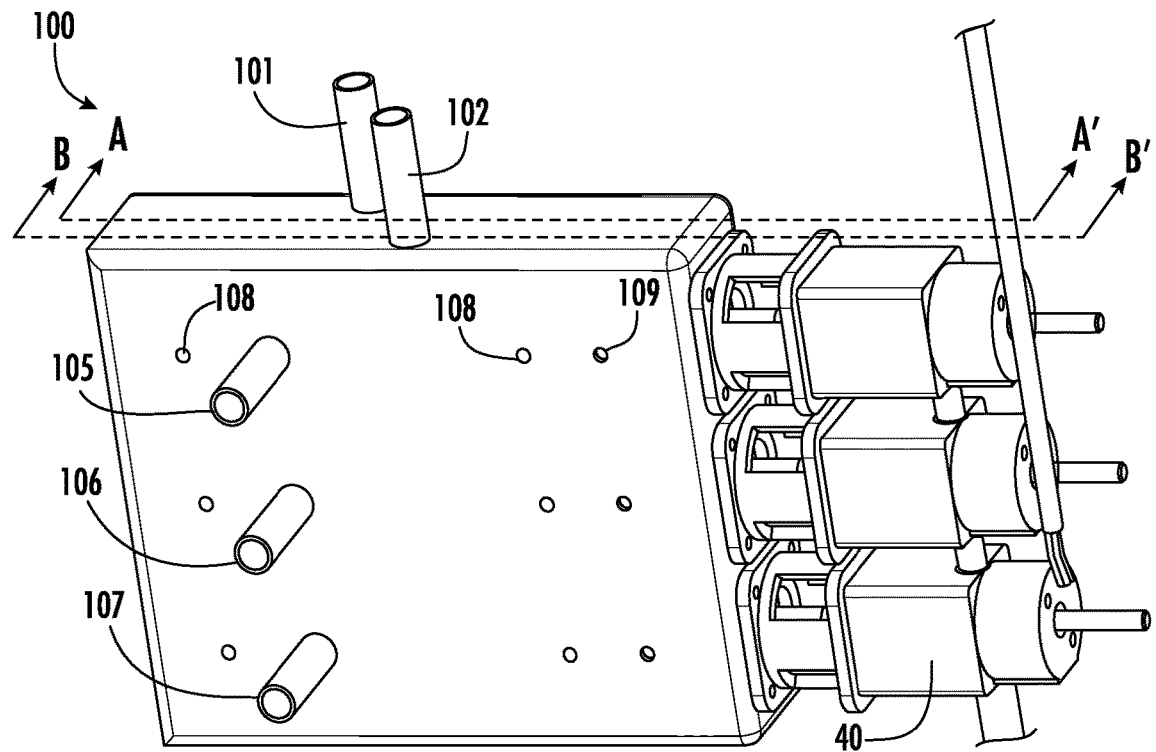
FIG. 6A shows a manifold that includes a plurality of valves according to one embodiment.
Figure 6B:
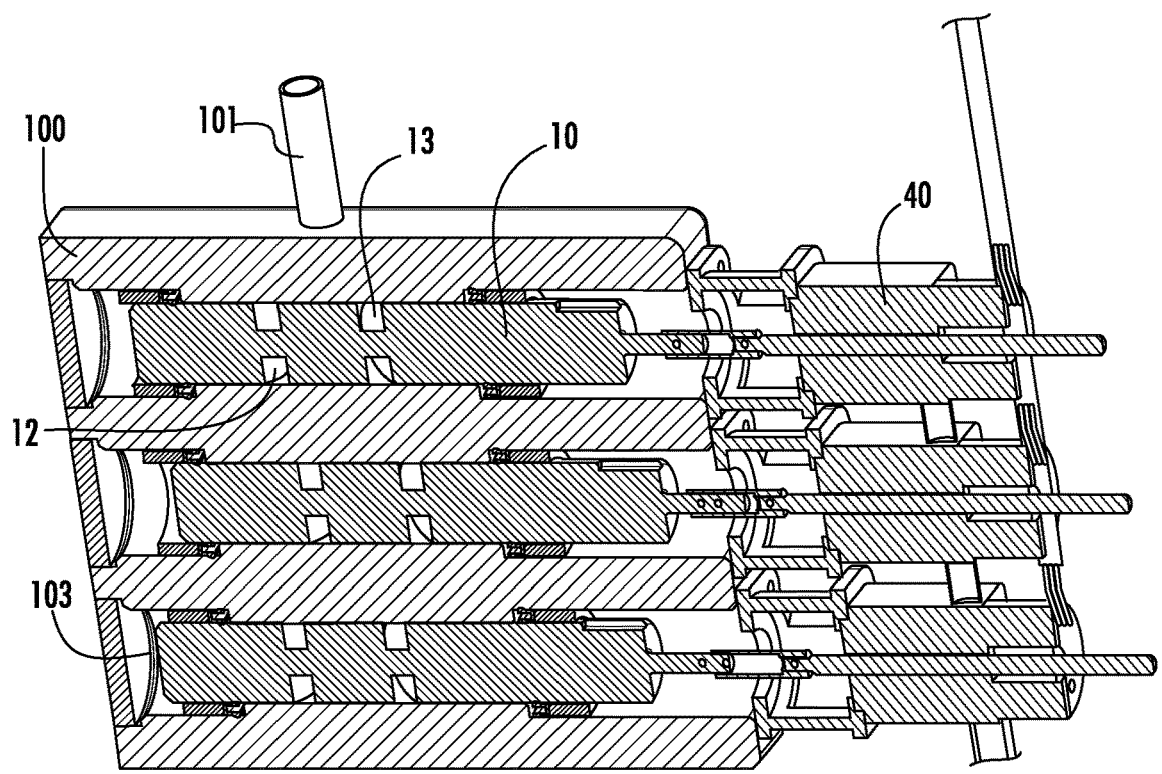
FIG. 6B is a cross-sectional view of the manifold of FIG. 6A taken along line A-A'.
Figure 6C:
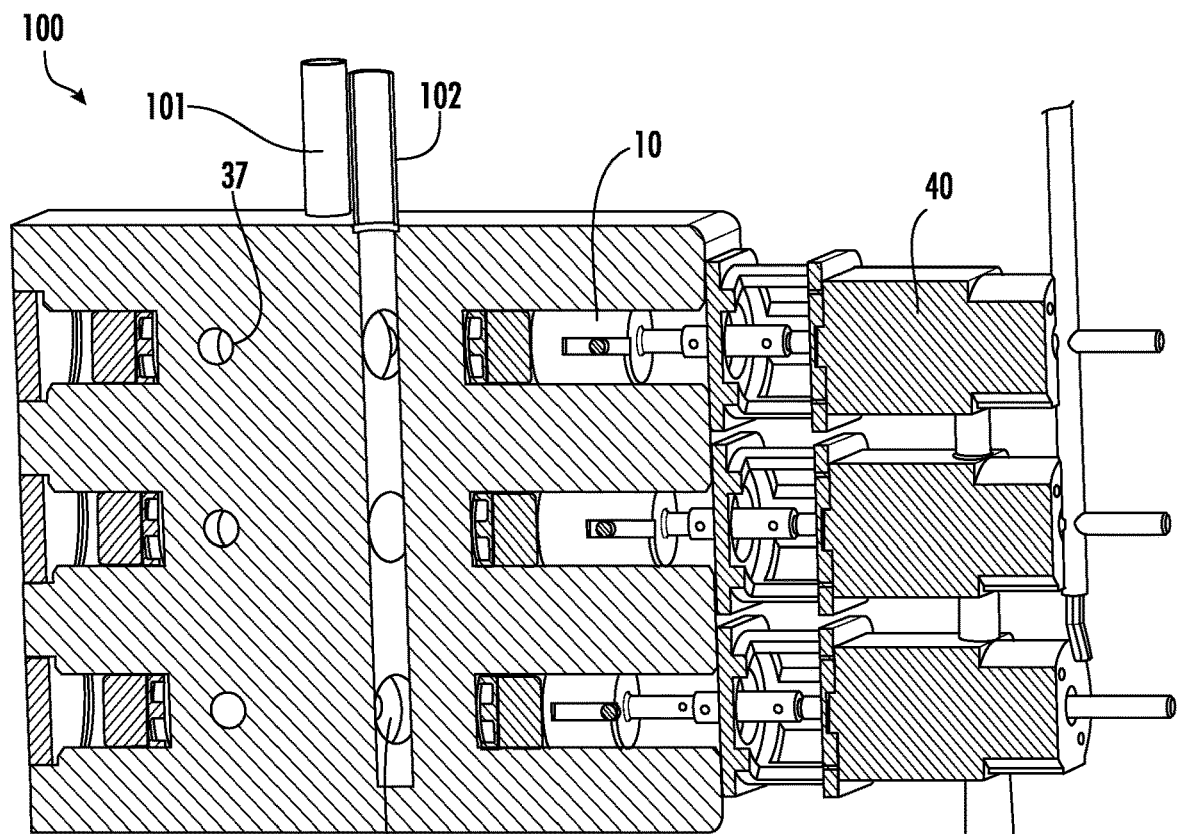
FIG. 6C is a cross-sectional view of the manifold of FIG. 6A taken along line B-B'.

As seen in FIG. 6A, each internal valve housing of the manifold 100 also comprises a plurality of seal holes 108, similar to seal holes 25 described above. Further, the manifold 100 may also have alignment holes 109, similar to the alignment holes 27 described above.

While FIGS. 6A-6C show three valves within the manifold 100, the disclosure is not limited to this embodiment. More or fewer valves 1 may be disposed within a manifold 100.

Further, while the manifold shown in FIGS. 6A-6C show the second housing outlets 38 for each valve 1 connected to a common bypass port, other embodiments are also possible. For example, each second housing outlet 38 may be in communication with a dedicated outlet. Similarly, while the figures show a common inlet, separate inlets may be utilized for each valve.

Figure 7A:
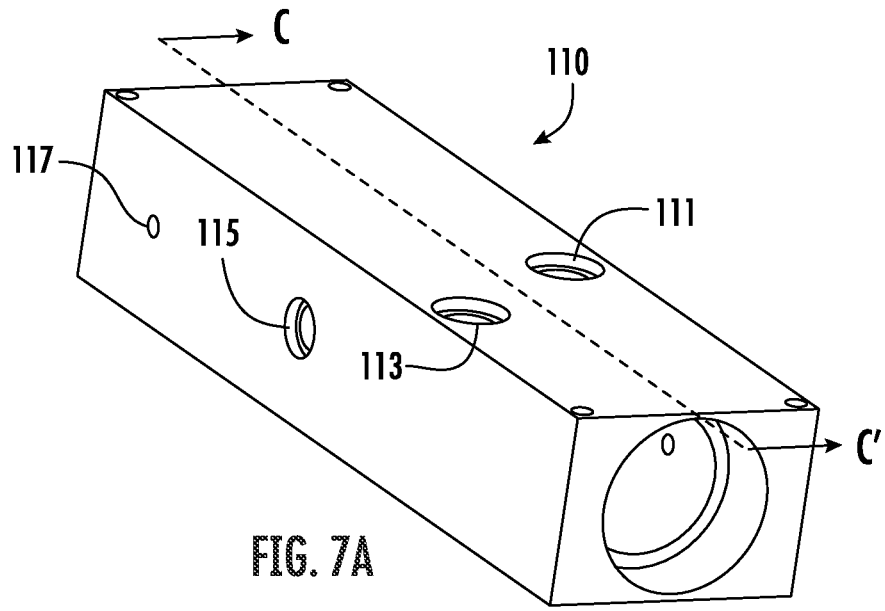
FIG. 7A shows a modular housing according to one embodiment.
Figure 7B:
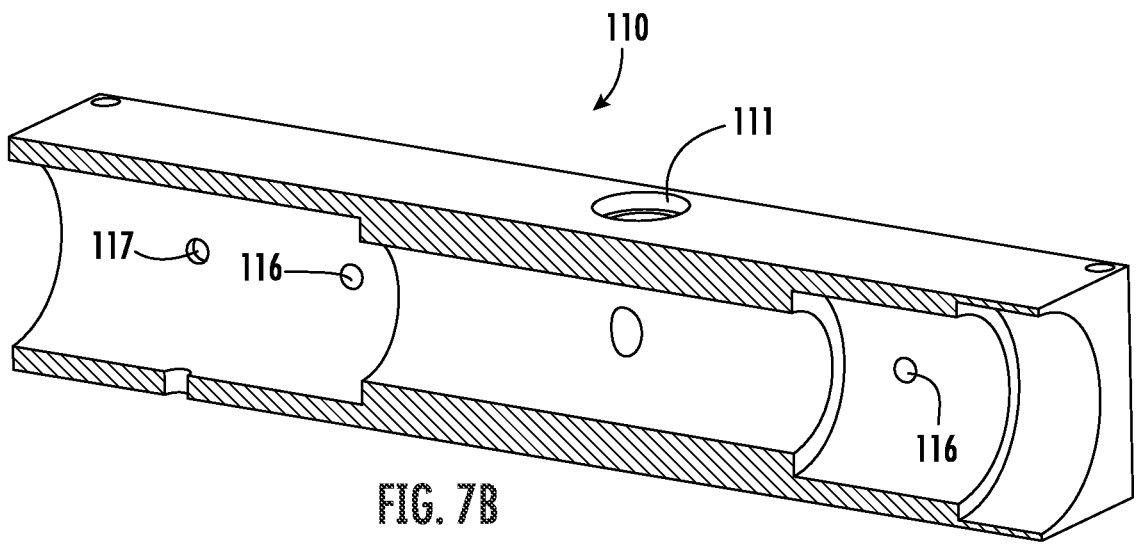
FIG. 7B shows the cross section of the modular housing of FIG. 7A taken along line C-C'.
Figure 7C:
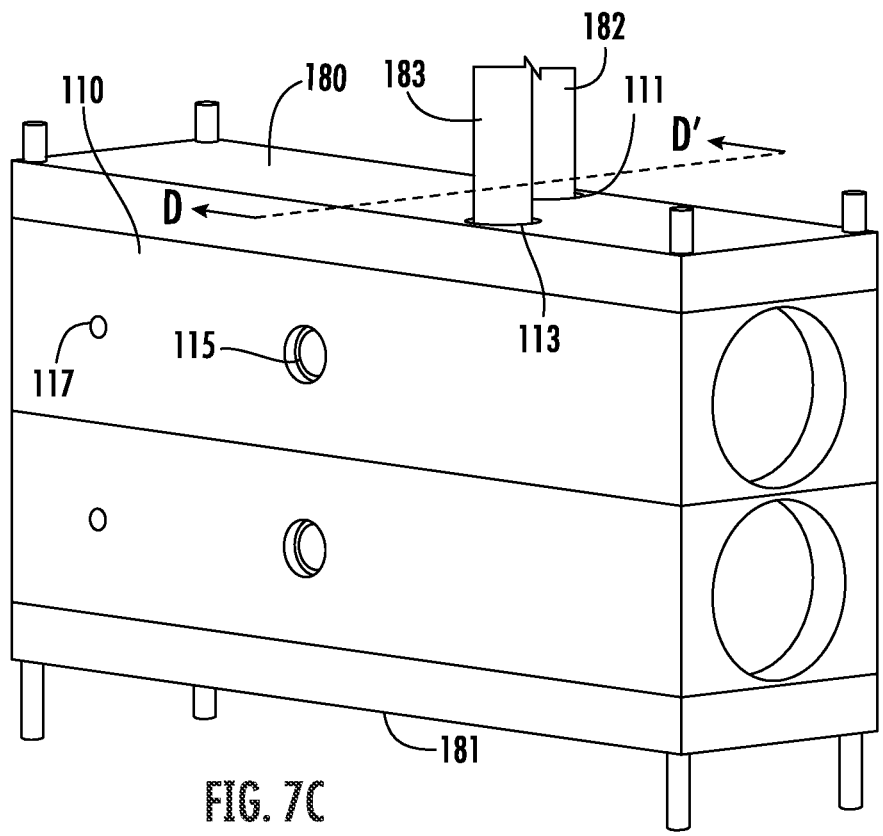
FIG. 7C shows two modular housings stacked on top of one another.
Figure 7D:
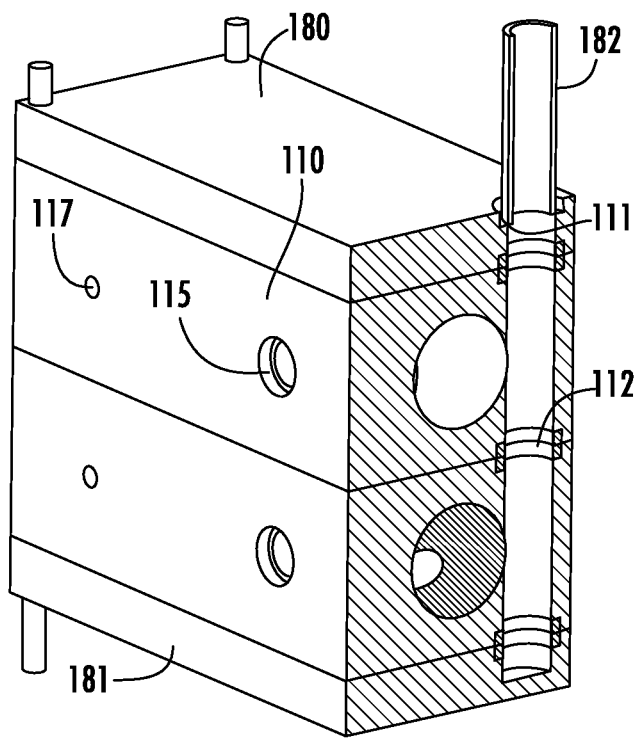
FIG. 7D shows a cross section of the stacked modular housings shown in FIG. 7C taken along line D-D'.

Alternatively, the valving system may be constructed from a plurality of separately housed valves, each having a housing that is intended to mate with other similar housings. FIGS. 7A-7D show a modular manifold that is created using a plurality of identical modular housings 110. FIG. 7A shows a modular housing 110. FIG. 7B shows a cross section of the modular housing 110 of FIG. 7A taken along line A-A'. FIG. 7C shows a manifold having two modular housings 110 stacked together. FIG. 7D shows a cross section of the manifold of FIG. 7C taken along line B-B'.

In this embodiment, each modular housing 110 has a housing inlet, and two housing outlets, as described with respect to FIG. 3. Additionally, each modular housing 110 comprises an inlet passage 111 that is in communication with the hollow interior of the modular housing (see FIGS. 7B and 7D) via the housing inlet and is also in communication with the inlet passage 111 on all other stacked modular housings 110 (see FIG. 7D). In other words, the inlet passage 111 passes from a first side of the modular housing 110, through the modular housing and exits on an opposite side of the modular housing. The inlet passage 111 is similar in function to the housing inlet 21 described earlier. In fact, the interaction between the inlet passage 111 and the spool 10 is the same as described above. In certain embodiments, a seal 112 (see FIG. 7D) may be disposed between adjacent modular housings 110 to ensure a liquid tight connection for the inlet passage 111 as it traverses the various modular housings 110.

Each modular housing 110 has an outlet 115, which performs the same function as the first manifold outlet 105, described above. The outlet 115 is in communication with the first housing outlet and the hollow interior of the modular housing 110. Additionally, as described above, each modular housing 110 also has two seal holes 116, similar to the seal holes 25 described above. Additionally, the modular housing 110 comprises an alignment hole 117, similar to the alignment hole 27 described above.

Each modular housing 110 also has a bypass port 113. Like the inlet passage 111, the bypass port 113 is in communication with the hollow interior of the modular housing 110 via the second housing outlet and is also in communication with the bypass port 113 on all other stacked modular housings 110. In other words, the bypass port 113 passes from a first side of the modular housing 110, through the modular housing and exits on an opposite side of the modular housing 110. The bypass port 113 is similar in function to the common outlet port 102 described earlier. In fact, the interaction between the bypass port 113 and the spool 10 is the same as described above. In certain embodiments, a seal may be disposed between adjacent modular housings 110 to ensure a liquid tight connection for the bypass port 113 as it traverses the various modular housings 110.

Although not shown, the spool 10, retaining rings 30, seals 31, fasteners 32, alignment pins 33 and actuator 40 are all disposed within each modular housing 110, so as to form a modular valve. A valving system may be created by stacking an arbitrary number of modular valves. Each actuator may be in communication with a controller. Further, as shown in FIGS. 7C-7D, a top cap 180 and a bottom cap 181 may be placed on the top and bottom of the outermost modular housings in the stack of modular housings 110. The top cap 180 has an inlet passage 111 which is in communication with the inlet passages of the other modular housings 110. The top cap 180 also has a bypass port 113 which is in communication with the bypass ports of the other modular housings 110. The bottom cap 181 may have no openings and may be used to terminate the bypass port 113 and the inlet passage 111.

Further, in certain embodiments, as shown in FIG. 7C-7D, an inlet conduit 182 and a bypass conduit 183 may be attached to the inlet passage 111 and the bypass port 113, respectively.

As described above, the source of the fluid may be common for all modular valves in the valving system. This fluid may enter through inlet conduit 182 and pass into the inlet passage 111. The bypass path for all of the modular valves may be common and may exit through bypass port 113 into bypass conduit 183.

The first housing outlet of each modular valve may be in communication with a respective dedicated outlet, such as outlet 115.

Figure 8:
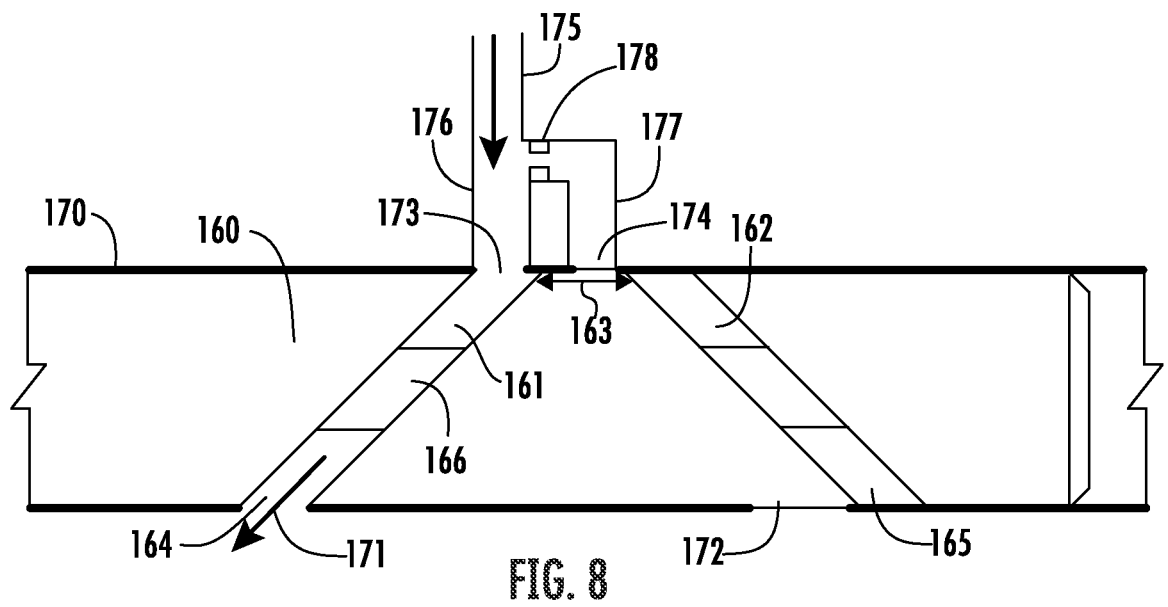
FIG. 8 shows a split input connection with flow balancing.

While FIGS. 1A-1B, 2A-2C, 4A-4C and 5A-5C all show that the passageways in the spool 10 converge at the inlet opening 15, other embodiments are also possible. For example, FIG. 8 shows another embodiment. In this embodiment, the spool 160 has a first passageway 161 and a second passageway 162. A dowel 166 is used to connect the portions of the spool 160. However, unlike the spools shown previously, the first ends of the first passageway 161 and the second passageway 162 do not converge at a single inlet. Rather, the first ends of the two passageways are separated by a separation distance 163. The second ends of the first passageway 161 and the second passageway 162 may terminate in a first outlet opening 164 and a second outlet opening 165, respectively.

The housing 170 comprises a first housing outlet 171 and a second housing outlet 172. The distance between the midpoint of the first housing outlet 171 and the midpoint of the second housing outlet 172 along the major axis may be the same as the minimum distance between the two passageways in the spool 160 along the major axis.

The housing 170 also has two inlets, a first housing inlet 173 and a second housing inlet 174. The first housing inlet 173 and the second housing inlet 174 may be in communication with an inlet conduit 175. The inlet conduit 175 may have two branches, a first branch 176 and a second branch 177. In certain embodiments, a flow restrictor 178 may be disposed in one of the two branches. In other embodiments, the flow restrictor 178 may not be employed. The flow restrictor 178 may be useful to help balance the flow in the event that the downstream load for each branch is different. For example, the first housing outlet 171 may be in communication with an external path that is long and winding, while the second housing outlet 172 may be in communication with a return path. Since the downstream impedance associated with the first housing outlet 171 is greater, a flow restrictor may be place on the second branch to balance the impedance associated with the second housing outlet 172.

The two housing inlets are positioned so as to be closer together than the separation distance 163. In certain embodiments, the distance between the midpoint of the first housing inlet 173 and the midpoint of the second housing inlet 174 along the major axis is equal to the separation distance 163. Further, the cross section of housing inlets 173, 174 may be equal to the first ends of the first passageway and the second passageway. In this way, in one position, shown in FIG. 8, the first housing inlet 173 is completely aligned with the first end of first passageway 161, while the second housing inlet 174 does not overlap the second passageway 162 at all. If the spool 160 is moved by a separation distance 163 to the left, the first housing inlet 173 does not overlap the first end of first passageway 161, while the second housing inlet 174 is completely aligned with the second passageway 162. If the spool 160 is moved by a distance of less than the separation distance 163 to the left, fluid will flow through both passageways.

This embodiment may also include the groove, the seal holes, the seals, the retaining rings, fasteners, alignment pins described above.

The valve of FIG. 8 may be incorporated into a valving system. For example, a manifold, similar to that shown in FIG. 6A, may be created. In one embodiment, the inlet port 101 may be split into two branches within the manifold so that one branch is in communication with each housing inlet. Alternatively, there may be two inlet ports entering the manifold 100, wherein one is in communication with the first housing inlets and the second is in communication with the second housing inlets. The dedicated outputs and the common outlet port 102 are as described above.

Additionally, the valve of FIG. 8 may be incorporated into the modular housing shown in FIG. 7A. Each modular housing may have two inlet passages 111, or may split the inlet passage 111 before it reaches the first housing inlet and the second housing inlet.

Figure 9:
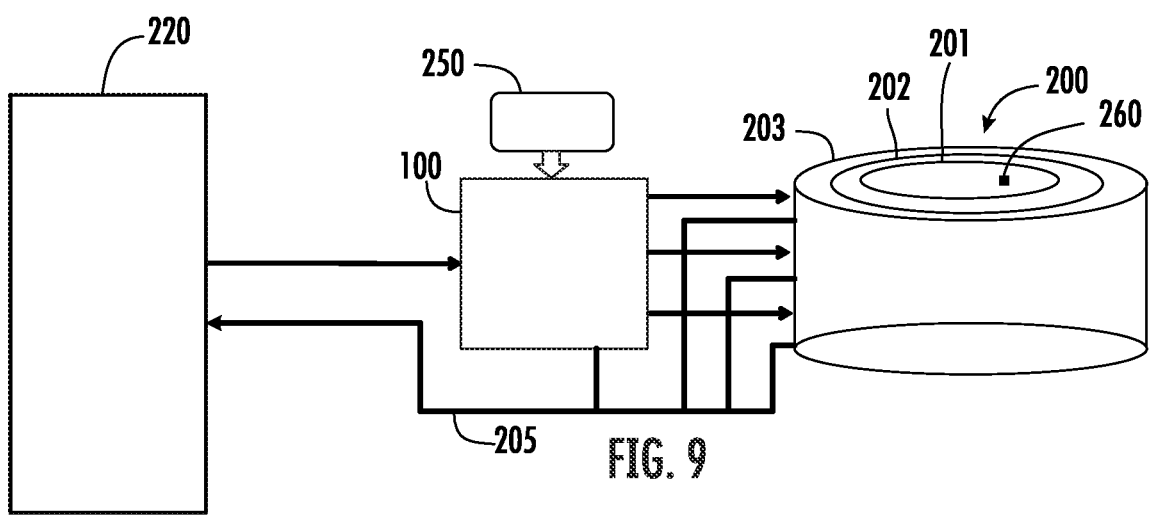
FIG. 9 shows a semiconductor processing system that utilizes a plurality of valves.

There are many applications for the valves disclosed herein. In one embodiment, shown in FIG. 9, the manifold 100 of FIG. 6A or a manifold formed using a plurality of individual valves incorporating the modular housing 110 of FIG. 7A may be used as part of a semiconductor processing system. In this embodiment, the semiconductor processing system includes a platen 200. The platen 200 may have a plurality of heating and/or cooling channels therethrough. As an example, there may be a first cooling channel 201 disposed near the center of the platen 200 so as to regulate the temperature of the top surface of the platen 200 at or near the center. A second cooling channel 203 may be disposed near the perimeter of the platen 200 so as regulate the temperature of the top surface of the platen at or near the outer edge. A third cooling channel 202 may be disposed between these two cooling channels to regulate the temperature of the rest of the top surface. The amount of cooling fluid that passes through each of these cooling channels may determine the temperature of that portion of the top surface of the platen 200.

The semiconductor processing system may also include a chiller 220. The chiller 220 may be used to cool a fluid, which may be a liquid or gas, to a chilled temperature, such as −80° C. to −95° C. In certain embodiments, the chiller 220 may function optimally when its output is a constant flow rate. The cooled fluid may travel in a closed loop such that after exiting from the chiller 220, the fluid later returns to the chiller 220 via a return path 205.

The output from the chiller 220 may enter the manifold 100 (or a plurality of valves 1 that are assembled using the modular housings 110) via the inlet port 101 (see FIG. 6A) or inlet passage 111 (see FIG. 7A). Each of the valves in the manifold 100 may be individually controlled by a controller 250. The controller 250 may include a processing unit, such as a microcontroller, a personal computer, a special purpose controller, or another suitable processing unit. The controller 250 may also include a non-transitory computer readable storage element, such as a semiconductor memory, a magnetic memory, or another suitable memory. This non-transitory storage element may contain instructions and other data that allows the controller 250 to perform the functions described herein. In certain embodiments, the controller 250 may be in communication with one or more thermal sensors 260 disposed on the platen 200.

The controller 250 may control each valve 1 by manipulating the actuators 40 such that a desired percentage of the fluid passes through the first passageway 12, while the rest exits through the second passageway 13. The second passageways 13 of all of the valves are in communication with the return path 205 from the platen 200, which returns the fluid to the chiller 220. Each first passageway is in communication with a first end of a respective cooling channel in the platen. The second end of each cooling channel is in communication with the return path 205. Thus, in this way, each cooling channel may achieve a desired flow rate, while the flow rate from the chiller 220 remains constant.

The valve described herein have many advantages. The present valve allows an incoming flow to be divided into two separate flows, while maintaining a constant flow rate. Further, this is done using a single actuator, so that multiple actuators do not have to be synchronized to achieve this result. Additionally, because the valve is linearly actuated, it can be easily incorporated into a manifold with a plurality of valve. Further, this valve has the ability to transition from 100% flow through the first passageway to 100% flow through the second passageway with constant flow by simply translating the spool within the housing or manifold. Further, by replacement of the spool with one with differently shaped and sized passageways, the parameters associated with the valve may be changed. For example, the flow rate and pressure drop through the valve may be varied by changing the size and shape of the passageways in the spool.

Additionally, in certain embodiments, the valves are utilized with a chiller. Chillers may operate optimally when running continuously with constant flow. Additionally, the chiller is often remote from the apparatus to be cooled. Thus, long conduits are used to connect the chiller to the apparatus. If there is not a continuous flow of fluid through these conduits, the conduits and the fluid within those conduits may warm to an unacceptably high temperature. The use of the present valve allows constant flow rate from the chiller, while diverting some fluid via the bypass path.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A linear actuated valve, comprising:
   a housing having a housing inlet, a first housing outlet and a second housing outlet, each in communication with a hollow interior of the housing;
   a spool disposed in the hollow interior and having a first passageway and a second passageway, where a first end of each passageway converges at an inlet opening, forming a first portion and a second portion of the inlet opening, a second end of the first passageway comprises a first outlet opening and the second end of a second passageway comprises a second outlet opening; and
   an actuator to translate the spool along a major axis of the spool,
   such that as the spool is translated along the major axis of the spool, a flow rate through one of the first passageway or the second passageway increases while the flow rate through another of the first passageway or the second passageway decreases.

2. The linear actuated valve of claim 1, wherein the first passageway and the second passageway pass through an interior of the spool.

3. The linear actuated valve of claim 1, wherein the first passageway and the second passageway pass through a majority of a cross section of the spool, and wherein a dowel extends through a center of the spool and is used to connect sections of the spool.

4. The linear actuated valve of claim 1, wherein the housing inlet is smaller than the inlet opening such that, in a first position, the housing inlet overlaps the first portion and does not overlap the second portion such that fluid passes through the first passageway, and, in a second position, the housing inlet overlaps the second portion and does not overlap the first portion such that fluid passes through the second passageway.

5. The linear actuated valve of claim 4, wherein in the first position, the first housing outlet overlaps the first outlet opening and the second housing outlet does not overlap the second outlet opening and in the second position, the second housing outlet overlaps the second outlet opening and the first housing outlet does not overlap the first outlet opening.

6. The linear actuated valve of claim 4, wherein as the spool moves from the first position to the second position, a total flow rate through the linear actuated valve is constant.

7. The linear actuated valve of claim 1, wherein a distance between a midpoint of the first housing outlet and a midpoint of the second housing outlet along the major axis is equal to a minimum distance between the first outlet opening and the second outlet opening along the major axis.

8. The linear actuated valve of claim 1, comprising two seals disposed between the housing and the spool, such that the housing inlet, the first housing outlet and the second housing outlet are disposed between the two seals.

9. The linear actuated valve of claim 1, where a groove is disposed in the spool and an alignment pin passes through the housing and enters the groove and is used to inhibit rotation of the spool about the major axis.

10. The linear actuated valve of claim 1, wherein the housing comprises a modular housing and comprises an inlet passage, a bypass port and an outlet, wherein the inlet passage enters one side of the housing, passes through the housing and exits on an opposite side of the housing and is in the communication with the housing inlet; wherein bypass port enters one side of the housing, passes through the housing and exits on an opposite side of the housing and is in communication with the second housing outlet; and wherein the outlet is in communication with the first housing outlet.

11. A manifold, comprising a plurality of the linear actuated valves of claim 10, wherein the inlet passage of each of the plurality of linear actuated valves are in communication with one another, and wherein the bypass port of each of the plurality of linear actuated valves are in communication with one another.

12. A cooling system for use in a semiconductor processing system, comprising:
   a chiller, having an output that supplies a chilled fluid at a constant flow rate and an input to receive a recirculated fluid;
   the manifold of claim 11, wherein the inlet passage is in communication with the output of the chiller and the bypass port is in communication with the input to the chiller; and
   a platen, comprising a plurality of cooling channels, wherein a first end of each cooling channel is in communication with the outlet of one of the modular housings, and the second end of each cooling channel is in communication with the input to the chiller.

13. A valving system having a plurality of linear actuated valves, comprising:
   a manifold comprising a plurality of hollow interior portions, wherein a portion of the manifold surrounds each hollow interior portion, and is referred to as an internal valve housing, and wherein each internal valve housing comprises a housing inlet, a first housing outlet and a second housing outlet, each in communication with the hollow interior portion; and wherein each valve comprises:
   the internal valve housing;
   a spool disposed in the hollow interior portion and having a first passageway and a second passageway, where a first end of each passageway converge at an inlet opening, forming a first portion and a second portion of the inlet opening, a second end of the first passageway comprises a first outlet opening and the second end of a second passageway comprises a second outlet opening; and
   an actuator to translate the spool along a major axis of the spool;
   wherein the housing inlet of each valve is in communication with an inlet port, the first housing outlet of each valve comprises a dedicated output and communication with a common outlet port.

14. A cooling system for use in a semiconductor processing system, comprising:
   a chiller, having an output that supplies a chilled fluid at a constant flow rate and an input to receive a recirculated fluid;
   the valving system of claim 13, wherein the inlet port is in communication with the output of the chiller and the common outlet port is in communication with the input to the chiller; and
   a platen, comprising a plurality of cooling channels, wherein a first end of each cooling channel is in communication with one of the dedicated outputs, and the second end of each cooling channel is in communication with the input to the chiller.

\* \* \* \* \*